United States Patent
Godet et al.

(10) Patent No.: US 10,479,147 B1
(45) Date of Patent: Nov. 19, 2019

(54) METHOD FOR ASSISTING WITH INFLATING THE TIRES OF A VEHICLE

(71) Applicants: Continental Automotive France, Toulouse (FR); Continental Automotive GmbH, Hannover (DE)

(72) Inventors: Sylvain Godet, Saint-Cezert (FR); Stéphane Billy, Grenade (FR); Sébastien Kessler, Dremil-Lafage (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/334,833

(22) PCT Filed: Sep. 18, 2017

(86) PCT No.: PCT/FR2017/052488
§ 371 (c)(1),
(2) Date: Mar. 20, 2019

(87) PCT Pub. No.: WO2018/055269
PCT Pub. Date: Mar. 29, 2018

(30) Foreign Application Priority Data

Sep. 23, 2016 (FR) ...................... 16 58968

(51) Int. Cl.
*B60C 23/04* (2006.01)
(52) U.S. Cl.
CPC ...... *B60C 23/0437* (2013.01); *B60C 23/0462* (2013.01); *B60C 23/0484* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 9,783,009 B2  10/2017  Kessler et al.
2015/0191056 A1*  7/2015  Mori ................... B60C 23/0416
73/146.5

(Continued)

FOREIGN PATENT DOCUMENTS

FR    3002492 A1    8/2014

OTHER PUBLICATIONS

International Search Report and Written Opinion for International Application No. PCT/FR2017/052488, dated Dec. 21, 2017—7 pages.
(Continued)

*Primary Examiner* — Andre J Allen
(74) *Attorney, Agent, or Firm* — RatnerPrestia (57) ABSTRACT

A self-adaptive method for assisting in the inflation of tires of a vehicle that is stationary in an immobilization mode, the method including continuously measuring at least the pressure of each tire by way of a wheel unit, transmitting signals on the state of the tires between each wheel unit and a central unit, these signals being transmitted by each wheel unit through frequency-shift keying between two first predetermined frequencies defining a first frequency band. In a immobilization mode, each wheel unit is reprogrammed such that it transmits, to the central unit, first and second frequency-shift keyed signals respectively with first and second frequency bands, the second band being wider than the first band.

12 Claims, 3 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/0493; B60C 23/04; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/0486; B60C 23/061; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 2015/0237627 A1* | 8/2015 | Deniau | H04W 72/0453 375/303 |
| 2015/0377741 A1 | 12/2015 | Stein et al. | |
| 2016/0167462 A1* | 6/2016 | Juzswik | B60C 23/0484 73/146.5 |
| 2016/0361958 A1* | 12/2016 | Steiner | B60C 23/04 |
| 2018/0022171 A1* | 1/2018 | Okada | B60C 23/0416 701/33.4 |

OTHER PUBLICATIONS

English translation of the Written Opinion for International Application No. PCT/FR2017/052488, dated Dec. 21, 2017—4 pages.

* cited by examiner

METHOD FOR ASSISTING WITH INFLATING THE TIRES OF A VEHICLE

CROSS REFERENCE TO RELATED APPLICATIONS

This application is the U.S. National Phase Application of PCT International Application No. PCT/FR2017/052488, filed Sep. 18, 2017, which claims priority to French Patent Application No. 1658968, filed Sep. 23, 2016, the contents of such applications being incorporated by reference herein.

FIELD OF THE INVENTION

The invention relates to a self-adaptive method for assisting in the inflation of tires of a vehicle, the vehicle being stationary in what is called an immobilization mode, the method consisting in continuously measuring at least the pressure of each tire by way of a wheel unit, and in transmitting signals on the state of the tires via a wireless link between each wheel unit and a central unit. The central unit continuously analyzes these signals and then transmits information in relation to the state of the tires to an information module.

A pressure variation above a predetermined threshold of a tire associated with each wheel unit, detected by the wheel unit, gives rise to the transmission of a signal to the central unit, these signals being transmitted by each wheel unit by frequency-shift keying between two first predetermined frequencies defining, between them, a first frequency band.

In a primary application, the invention relates to systems installed on motor vehicles for monitoring and managing tire pressure, called TPMS ("tire pressure monitoring system") systems.

BACKGROUND OF THE INVENTION

As monitoring the pressure of tires is essential to the safety of motor vehicles, pressure-monitoring systems, such as TPMS systems, were created to perform this function and installed on motor vehicles.

These primarily comprise sensors that measure the pressure of the tires and transfer it to the central unit. This central unit collects and analyzes the tire pressure data via wireless links. The result of these analyses is generally displayed on the dashboard of the vehicle. Such a system is therefore able to inform the driver of the tire pressure in real time, or just produce a visual or audio announcement if pressure anomalies are detected by this system. It is also possible for the driver to receive this information on a mobile telephone.

This may be performed by way of frequency-shift keyed signals. Frequency-shift keying is known under the acronym FSK. In the following text, frequency-shift keying will be used to denote this type of digital frequency modulation, which is performed between predetermined frequencies.

One example of a wheel unit communicating with a central unit through frequency-shift keying in order to measure a pressure or the temperature inside a tire is given for example by document US 2015/377741, incorporated herein by reference.

As mentioned above, a method for assisting in the inflation of tires of a vehicle is performed when the vehicle is stationary, this being given the name in immobilization mode. In these cases of the vehicle being stationary, a major problem of a risk of poor transmission between the tires and the central unit arises.

Specifically, when the wireless links between the pressure sensors of the wheel units and the central unit encounter obstacles, the level of reception of the signals at the central unit decreases to the point that these signals may become inaudible. The positions of the wheels that generate these reception problems are called black spots.

If the stoppage of the vehicle corresponds, for one or more wheels, to black spot conditions, the transmission remains impacted throughout the entire duration of the stoppage, as the position of the wheel does not vary. These black spots may be caused for example by the position of the transmitter antenna of a wheel unit, by reflection on the ground of part or of all of the transmitted signal, or by the relative position of the wheel unit with respect to the central unit.

Experience has shown that, in a stationary position, the probability of the wheel unit of at least one wheel being in a black spot position is significant and non-negligible. When a wheel unit is stationary at a black spot, the budget of its link to the central unit is greatly degraded, up to around −90 dBm. In this case, the signal received by the central unit is no longer able to be analyzed due to the excessively low signal-to-noise ratio.

No prior art document has taken into account this problem of stopping on a black spot for frequency-shift keyed signals. Common practice is to search, for frequency-shift keying, for a predetermined frequency band that is as narrow as possible. This was supposed to optimize frequency-shift keying communication and guarantee it in all conditions, which is clearly not the case for a black spot.

Document FR 3 002 492, incorporated herein by reference, describes a self-adaptive method for assisting in the inflation of tires of a vehicle, consisting in continuously measuring at least the pressure of each tire by way of a wheel unit, and in transmitting signals on the state of the tires via a wireless link between each wheel unit and a central unit at least two different bit rates, called high bit rate and low bit rate. The central unit then continuously analyzes these signals and then transmits information in relation to the state of the tires to an information module. A continuous measurement of the shift/immobility state of the vehicle is also provided to the central unit and to the wheel unit.

Although decreasing the bit rate proves to be effective, given that replacing a high-bit rate transmission with a low-bit rate transmission allows an improved signal-to-noise ratio and enables a reception sensitivity gain, thus allowing the signals to be received, this document does not give any indication with regard to modifying parameters of signal frequency-shift keying that could solve the problem of defective transmission due to the presence of a black spot for at least one of the wheels of a stationary motor vehicle.

SUMMARY OF THE INVENTION

The problem underlying the present invention is that of improving defective transmission between a wheel unit of a stationary vehicle and a central unit due primarily to a fixed position of the wheel that is not favorable to transmission between its wheel unit and the central unit, in the context of a method for assisting in the inflation of tires of a vehicle.

To this end, an aspect of the present invention relates to a self-adaptive method for assisting in the inflation of tires of a vehicle, the vehicle being stationary in an immobilization mode, the method consisting in continuously measuring at least the pressure of each tire by way of a wheel unit, in transmitting signals on the state of the tires via a wireless link between each wheel unit and a central unit, the central unit continuously analyzing these signals and then transmitting information in relation to the state of the tires to an information module, a pressure variation above a predetermined threshold of a tire associated with each wheel unit and detected by the wheel unit giving rise to the transmission of a signal to the central unit, these signals being transmitted by each wheel unit through frequency-shift keying between two first predetermined frequencies defining, between them, a first frequency band, characterized in that, when the vehicle is stationary in immobilization mode, each wheel unit is reprogrammed such that each wheel unit transmits, to the central unit, a first frequency-shift keyed signal with the first frequency band and a second frequency-shift keyed signal with a second frequency band wider than the first band.

The prior art provided for a frequency-shift keyed signal to restrict the frequency band for as long as possible in order to optimize communication between a wheel unit and the central unit and guarantee this communication in all conditions. There was therefore a prejudice in the prior art to operate with a wide frequency band.

An aspect of the present invention overcomes this prejudice by operating with two modulated signals each having a different bandwidth. An aspect of the present invention applies in the specific case of a black spot, which is caused by a position of the sensor in the wheel that is unfavorable as to good transmission. This unfavorable position persists, given that the wheel is not turning, as the vehicle is stationary.

Therefore, an aspect of the present invention is not to seek to optimize communication between the wheel unit in question and the central unit for all positions of the wheel, but to allow transmission for a fixed wheel position involving a black spot when the vehicle is stationary. As soon as the vehicle is in driving mode with a turning wheel, there is no longer a need to use two modulated signals each with a different frequency bandwidth, and the system changes back to a mode with a single modulated signal with a narrow frequency bandwidth, as advocated by the prior art.

According to the prior art, those skilled in the art sought to transmit the signal without considering the position of the areas of no transmission. A protocol with a pseudorandom time interval makes it possible to cover the constraint of no transmission linked to an area of no transmission. Over time, this protocol makes it possible to cover the entire wheel, and thus guarantee that the signal has been transmitted correctly. This approach is not possible if the vehicle is immobilized, that is to say in parking mode, the area of no transmission being invoked, the pseudorandom protocol being ineffective because the vehicle is immobile. This is solved by the an aspect of present invention, which guarantees transmission even in parking mode.

The reprogramming of each wheel unit such that each wheel unit transmits, to the central unit, first and second modulated signals is performed automatically, without external assistance, upon detection of conditions representative of the immobilization mode of the vehicle.

Advantageously, the first frequency band is around 30 kHz and the second frequency band is equal to or greater than 50 kHz.

Advantageously, as soon as reception of the modulated signal from a wheel unit takes effect at the central unit, this modulated signal being the first frequency-shift keyed signal with the first frequency band or the second frequency-shift keyed signal with the second frequency band, the central unit is reprogrammed so as to perform filtering of the received modulated signal using at least one of two different filter bandwidths that alternate periodically.

The central unit receives two modulated signals having different frequency bands. Each of these modulated signals is to be filtered by way of filtering having a specific bandwidth. As the central unit is not able to recognize whether the modulated signal that it receives is modulated by the first frequency band or by the second frequency band, the central unit applies to it the two filtering operations with different bandwidths.

Advantageously, the period of alternation between the two different bandwidths depends on a duration of the signal, such that the received modulated signal is able to be filtered with the two bandwidths if a first filtering operation with one of the two bandwidths has not given a useful signal. This makes it possible to apply the two filtering operations with different bandwidths to the first or to the second modulated signal so as to optimize filtering of the signals.

Advantageously, the two filter widths are respectively a narrow width of around 50 kHz and a wide width of around 300 kHz.

Advantageously, upon reception of the modulated signal from a wheel unit, the central unit, which is then in standby state, is reprogrammed so as to change to periodic awake mode. Automatically putting the central unit into standby when the vehicle is stationary allows energy to be saved as soon as the vehicle is stationary, this stoppage being able to be a stoppage in order to inflate the tires and not requiring the central unit to remain awake. By contrast, in the specific case of inflating the tires, the central unit should be awake.

Advantageously, the stoppage in immobilization mode is defined by an immobilization of the vehicle for a duration greater than a predetermined threshold duration. This duration makes it possible to check that the vehicle is stationary for a certain time, for example for a maintenance operation or due to the driver leaving the vehicle, and that the vehicle is therefore not likely to be restarted straight away.

Advantageously, each wheel unit and the central unit are set by default to a driving mode detected by a movement of the vehicle, for which driving mode each wheel unit is programmed so as to transmit, to the central unit, a frequency-shift keyed signal with the first frequency band and, when the central unit has been reprogrammed so as to perform filtering of the received modulated signal using at least one of two different filter bandwidths, the central unit is programmed so as to perform filtering of the modulated signal using the larger of the filter bandwidths, each wheel unit also being programmed, in this driving mode, so as to transmit the frequency-shift keyed signals with the first frequency band.

In driving mode, the modulated signal has a narrow frequency band, and the central unit performs specific filtering at this narrow frequency band. Each wheel unit therefore returns to the normal transmission conditions and the central unit therefore returns to the normal reception conditions defined by default by a nominal driving mode.

Advantageously, the signals that are frequency-shift keyed by each wheel unit are transmitted, when the vehicle is stationary in immobilization mode, at a second bit rate lower than a first bit rate which is that of the driving mode.

In this optional feature of the method according to an aspect of the invention, the modulated signals are transmitted, when the vehicle is stationary in immobilization mode, at a bit rate low enough that the reception sensitivity of the central unit makes it possible to avoid virtually any reception interference. Thus, in the event of reception subjected to interference by a black spot, the signal level received by the central unit may for example drop below −90 dBm or lower.

Replacing a high-bit rate transmission of the modulated signals with a low-bit rate transmission allows an improved signal-to-noise ratio and enables a reception sensitivity gain. For example, a high bit rate value, or first bit rate in driving mode, in this measurement field may be 9.6 Kbits/s, and a lower bit rate or low bit rate value, as advocated by an aspect of the present invention, may be 2 Kbits/s. This thus allows the reception of modulated signals that could previously have been lost at a high bit rate.

An aspect of the invention also relates to a system for assisting in the inflation of tires of a vehicle, the vehicle being stationary in an immobilization mode, the method consisting in continuously measuring at least the pressure of each tire by way of a wheel unit, in transmitting signals on the state of the tires via a wireless link between each wheel unit and a central unit, the central unit having means for continuously analyzing these signals and then means for transmitting information in relation to the state of the tires to an information module, a pressure variation above a predetermined threshold of a tire associated with each wheel unit and detected by detection means of the wheel unit giving rise to the transmission of a signal to the central unit by transmission means of the wheel unit, these signals being transmitted by each wheel unit through frequency-shift keying between two first predetermined frequencies defining, between them, a first frequency band, characterized in that, when the vehicle is stationary in immobilization mode, the system implements such a method and comprises means for reprogramming each wheel unit such that each wheel unit transmits, to the central unit, a first frequency-shift keyed signal with the first frequency band and a second frequency-shift keyed signal with a second frequency band wider than the first band.

BRIEF DESCRIPTION OF THE DRAWINGS

Other features, aims and advantages of aspects of the present invention will become apparent upon reading the following detailed description and with reference to the appended drawings, given by way of nonlimiting example and in which.

DETAILED DESCRIPTION OF THE PREFERRED EMBODIMENTS

Figure 1:
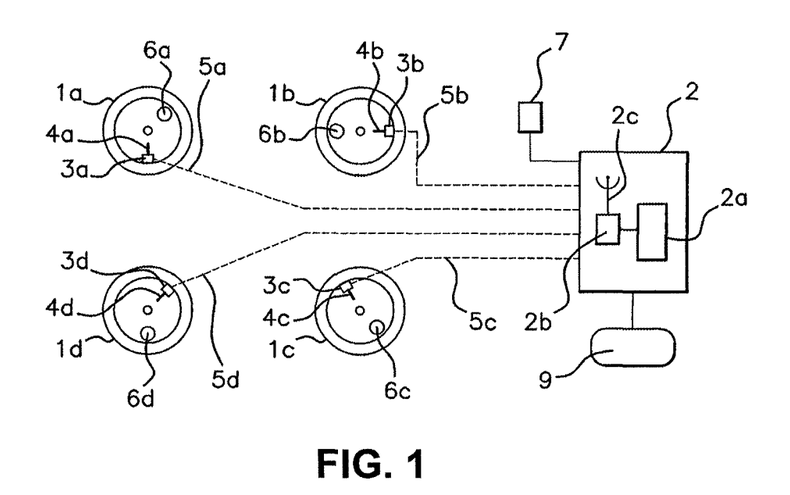
FIG. 1 is a schematic depiction of one embodiment of a tire management system of a vehicle able to implement the method according to an aspect of the invention.

With reference to the basic diagram of FIG. 1, the four tires 1a to 1d of a motor vehicle, not shown, are each equipped with a wheel unit 3a to 3d. These wheel units 3a to 3d include antennas 4a to 4d that transmit signals, transmitted via radiofrequency links 5a to 5d, to a central unit 2. The four tires 1a to 1d also each include a movement sensor 6a to 6d.

Each of these sensors 6a to 6d periodically transmits, by way of a wireless link, not shown, the stationary or movement information from the respective wheel unit 3a to 3d to the central unit 2. A central movement sensor 7 is electrically connected to the central unit 2. It is dedicated to the information from the central unit 2 on the stationary or moving situation of the vehicle, and communicates its own measurement thereto.

The central unit 2 thus has the complete status of the movement/immobilization of the vehicle from all of the movement sensors 7, 6a to 6d. The central unit 2 is intended to continuously analyze the information provided by the wheel units 3a to 3d and by the movement sensors 7, 6a to 6d: for example pressure, temperature, acceleration and "moving or stationary" state in the example illustrated.

The central unit 2 includes at least the following elements: a microcontroller 2a, a receiver 2b and an antenna 2c. This central unit 2 thus receives the signals coming from the wheel units 3a to 3d with respective powers that will vary depending on the position of the antennas 4a to 4d and on the surroundings of the wheel units 3a to 3d and on the central unit 2. For example, the engine and the devices of the vehicle may influence the surroundings of the wheel units 3a to 3d and interfere with the signals, in particular through reflections on the ground.

These power variations may lead to low levels of reception by the central unit 2. After analyzing the received information, the central unit 2 displays, on a display module 9, the relevant information for the driver, in particular: immediate warning in the event of a severe pressure reduction for at least one tire and, for minor pressure reductions, for example less than 0.10 bar, warning communicated only when the vehicle is next stationary. This may also be performed on the screen of a mobile telephone equipped with the appropriate application.

The signals from each wheel unit 3a to 3d to the central unit 2 are radiofrequency frequency-shift keyed signals between two predetermined frequencies. According to the prior art, this is performed both in a driving mode while the vehicle is driving and in an immobilization mode while the vehicle is stationary, for example at a service station in order to inflate its tires.

In the latter case, it has been established that, as the wheel is immobile, if the stoppage of the vehicle corresponds, for one or more wheels, to black spot conditions, the transmission remains impacted throughout the entire duration of the stoppage. To overcome this drawback, an aspect of the present invention proposes to differentiate the immobilization mode from the driving mode for the transmission of modulated signals from each wheel unit 3a to 3d to a central unit 2 by sending, in immobilization mode, two modulated signals containing the same information but differing in terms of their bandwidth between two predetermined frequencies, which will be described in further detail in the following text.

Figure 3:
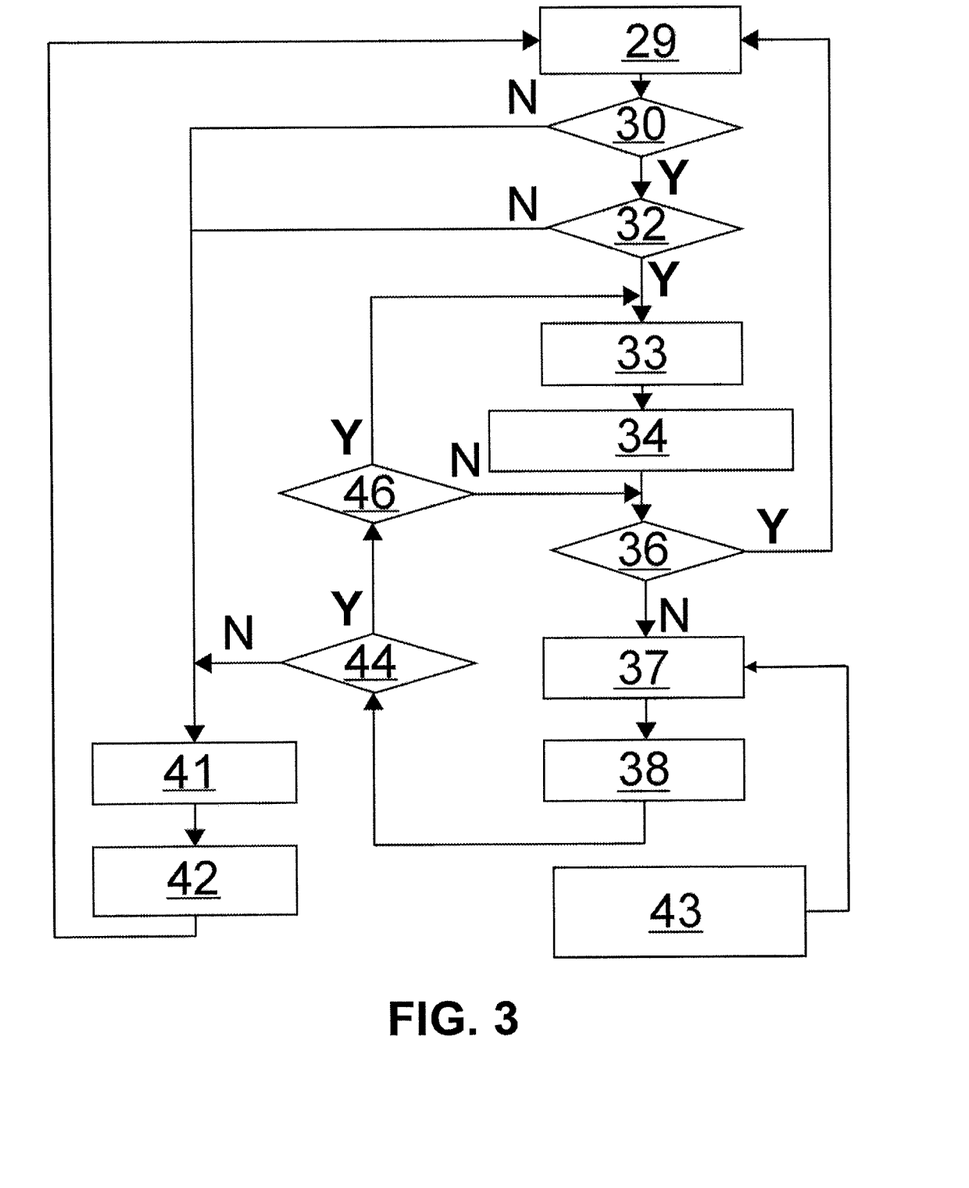
FIG. 3 shows a flow chart of the steps of one exemplary implementation of the method according to an aspect of the invention on the side of a wheel unit.

FIG. 3 describes in more detail an exemplary flow chart of the steps of one embodiment of the method according to an aspect of the invention at a wheel unit 3a to 3d for achieving the sensitivity improvement at the central unit 2, as described above. This flow chart comprises the following steps.

After the start or beginning 29 of this method, a test, called start of stoppage test 30, on the moving/stationary state of the vehicle is performed by way of a continuous measurement provided by a movement sensor of a wheel unit 3a to 3d. If the result of the start of stoppage test 30 indicates a driving state of the vehicle, this being represented by N for No at the output of this start of stoppage test 30, the wheel unit 3a to 3d is set to a driving mode, which is its nominal state, this being referenced at 41.

Digitized periodic signals are then transmitted in this mode, this being referenced at 42. The method then returns to the start 29. These digitized periodic signals are frequency-shift keyed signals between two first predetermined frequencies defining, between them, a first frequency band, which will be the narrower frequency band of the two frequency bands for transmitting two types of modulated signal during an immobilization mode in the context of an aspect of the present invention, which mode will be described in more detail further on.

If the result of the start of stoppage test 30 indicates a stationary state of the vehicle, this being represented by Y for Yes at the output of this start of stoppage test 30, a pressure variation start test 32 is performed on the pressure variation ΔP of the tire of the wheel unit 3a to 3d with respect to a given threshold value, for example equal to 0.1 bar, so as to detect inflation of the tire, for example in a service station.

If the pressure variation start test 32 is positive, this being represented by Y for Yes at the output of this pressure variation test 32, the wheel unit concludes, in step 33, that inflation is detected, for example when the vehicle is present at a service station in order to inflate the tire associated with the wheel unit 3a to 3d. After step 33 of detecting inflation has concluded, a time countdown is initialized in step 34, in particular but without limitation starting from a duration of 120 seconds in this example.

A time countdown test 36 relates to the countdown of step 34 counting down to zero. Thus, for as long as the elapsed duration remains less than the reference value, 120 seconds in the example, this being referenced by the output No N at this time countdown test 36, the wheel unit 3a to 3d then switches its setting to immobilization mode, this being referenced at step 37.

During this immobilization mode 37, each wheel unit 3a to 3d is reprogrammed such that each wheel unit 3a to 3d transmits, to the central unit 2, a first frequency-shift keyed signal with the first frequency band and a second frequency-shift keyed signal with a second frequency band wider than the first frequency band. This reprogramming step, which is essential in the context of an aspect of the invention, is referenced at step 43.

This reprogramming may also simplify the signals, so as to make them shorter by making them contain only the identification of the wheel unit 3a to 3d and therefore of the tire associated with pressure information, this being referenced 38.

Optionally, the signals that are frequency-shift keyed by each wheel unit 3a to 3d are transmitted, when the vehicle is stationary in immobilization mode, at a second bit rate lower than the first bit rate, the second bit rate being low enough that a reception sensitivity of the central unit 2 makes it possible to avoid virtually any reception interference. This is applicable for the frequency-shift keyed signals between both the narrow first frequency band and the wider second frequency band.

Optionally, the wheel unit 3a to 3d may also transmit frames at a high bit rate so as to redundantly secure the transmission. The low-bit rate signals are shorter in terms of bit number, so as to have a temporal duration at most equal to those of the high-bit rate signals in "driving" mode, so that the duration of the low-bit rate signals also complies with official standardization standards. To this end, these signals contain a limited amount of information, containing only its identity and the pressure value in the example. The advantage of using this low bit rate is that of improving the link budget in the event of stoppage on a black spot.

The immobilization mode 37 continues as long as the method runs through a loop including the following steps. A first step of this loop relates to an end of stoppage test 44 for the vehicle, which is substantially equivalent to the start of stoppage test but at the end of stoppage.

If the response to this end of stoppage test 44 is No N, this corresponding to the detection of a vehicle that is no longer immobilized, there is a change to driving mode 41, this representing the first possibility of exiting the loop of the immobilization mode. In the event of a response No N to the end of stoppage test 44, the method, by switching the wheel unit 3a to 3d to driving mode 41, follows the steps 42, 29 described above starting from this step in driving mode 41.

If the response to this end of stoppage test 44 is Yes Y, this corresponding to the detection of a vehicle that is still immobilized, the loop is continued by a pressure variation end test referenced 46.

In this pressure variation end test 46, if the pressure variation of the tire of the wheel unit 3a to 3d in question is lower than the given threshold value, this value advantageously being the same threshold value as for the pressure variation start test 32, this being illustrated by the output No N of this test, there is a return to the time countdown test 36. If the countdown has not yet reached zero, this being illustrated by the output No N of the time countdown test 36, the immobilization mode 37 is maintained for the wheel unit 3a to 3d. This corresponds for example to a stationary situation, in an inflation station at the end of the process of inflating a tire or tires.

Starting from the time at which the reference duration of the time countdown test 36 is reached, this being illustrated by the output Yes Y of this time countdown test 36, it is concluded that the inflation process has ended, and there is a return to the start 29 of the method, this representing the second possibility of exiting the loop of the immobilization mode.

Another possibility of exiting this loop of the immobilization mode is the detection, in the pressure variation end test 46, of a pressure variation in the tire of the wheel unit 3a to 3d greater than or equal to the predetermined threshold value, which is advantageously the same as for the pressure variation start test 32. In the event of a response Yes, symbolized by Y, to this test 46, it is concluded that inflation is detected 33, therefore that the vehicle is present at a service station for inflating the tire corresponding to the wheel unit 3a to 3d. The method then follows steps 34, 36, 37, 38, 44, 46 described above starting from step 33, with the wheel unit 3a to 3d being kept in its specific reprogramming for the immobilization mode or the wheel unit 3a to 3d being changed to its driving mode at 41, 42.

The wheel units 3a to 3d of the vehicle, generally 4 of them, each follow the method illustrated in this FIG. 3. These wheel units 3a to 3d do not necessarily switch from "driving" mode to "immobilization" mode at the same time, for example due to not simultaneously receiving pressure variations.

Without limitation, for frequency-shift keyed signals between two frequencies, the first frequency band for the first signals is around 30 kHz and the second frequency band for the second signals is equal to or greater than 50 kHz.

Figure 2:
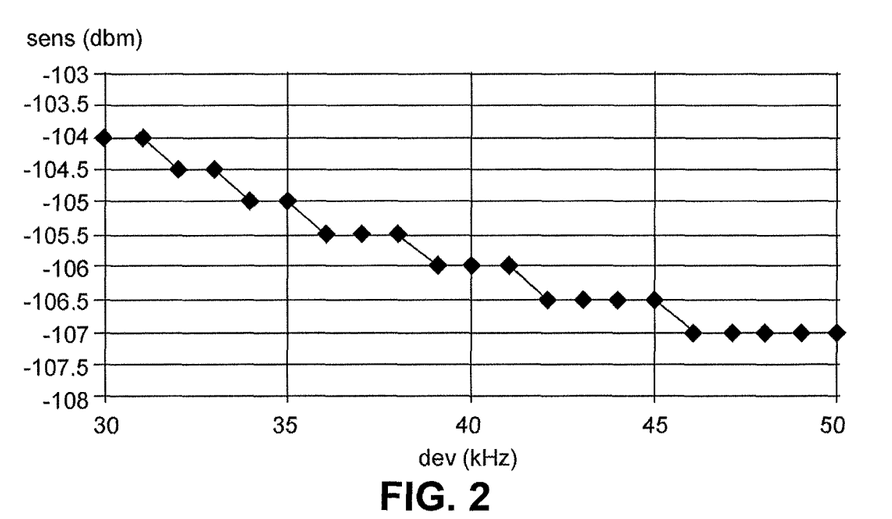
FIG. 2 shows an evolution of the sensitivity of a receiver, which is the central unit, as a function of a shift that corresponds to the frequency bandwidth of a frequency-shift keyed signal.

FIG. 2 shows an evolution of the sensitivity sens of a receiver, which is the central unit 2, as a function of a shift dev that corresponds to the frequency bandwidth of a frequency-shift keyed signal. A variation of 3 dBm between a shift or frequency bandwidth of +/−30 kHz, which may be the first narrower bandwidth, and a shift of +/−50 kHz, which may be the second wider bandwidth, is observed.

Figure 4:
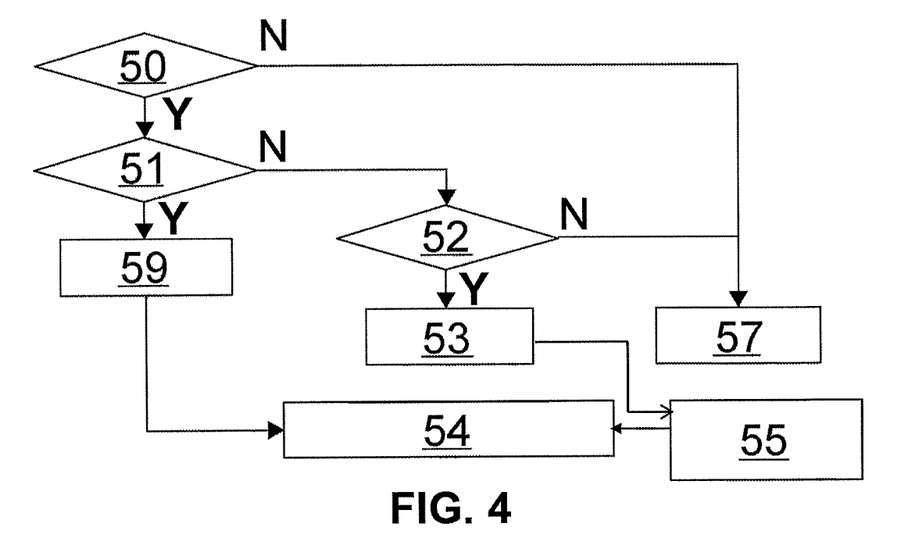
FIG. 4 shows a flow chart of the steps of one preferred exemplary implementation of the method according to an aspect of the invention on the side of the central unit.

The operation of the central unit 2, which will be illustrated in FIG. 4, may make it possible to receive both frequency-shift keyed signals between a narrow frequency band, coming from at least one wheel unit 3a to 3d in driving mode, previously referenced 41 in FIG. 3, on the one hand, and pairs of frequency-shift keyed signals respectively between a narrow frequency band and a wide frequency band coming from at least one wheel unit in immobilization mode, previously referenced 37 in FIG. 3, on the other hand.

As illustrated in FIG. 4, the self-adaptive method for assisting in the inflation of tires of a vehicle on the side of the central unit 2, which is optional in the context of an aspect of the present invention, comprises a start of stoppage test step 50 similar to the stoppage test 30 performed at the wheel unit 3a to 3d and shown in FIG. 3. It is then determined whether the vehicle is moving or stationary.

If the vehicle is moving, this corresponding to the response No N, the central unit 2 receives, in step 57, signals in "driving" mode, that is to say frequency-shift keyed signals between two first predetermined frequencies defining, between them, a first frequency band, which may be the narrower band of the two types of signal transmitted by each wheel unit 3a to 3d in immobilization mode.

If the vehicle is stationary, this corresponding to the response Yes Y, a time countdown test 51 similar to the time countdown test 36 performed at the wheel unit 3a to 3d illustrated in FIG. 3 is performed, although this one may have a different reference duration. This reference duration may be equal to 45 seconds in the example, whereas the reference duration for the wheel unit 3a to 3d may be 120 seconds.

As long as the elapsed duration remains less than 45 seconds, this corresponding to the response No N to the time countdown test 51, a pressure variation detection test 52 is performed so as to determine whether a tire is currently being inflated. If the pressure variation detected in the pressure variation detection test 52 remains lower than a predetermined threshold, for example 0.1 bar, this corresponding to the response No N to the test, the central unit 2 is receiving in driving mode without reprogramming for the reception of the modulated signals, this driving mode being referenced 57.

By contrast, if the pressure variation detected in the pressure variation detection test 52 becomes greater than the predetermined threshold, this corresponding to the output Yes Y of FIG. 4, the central unit 2 concludes that the vehicle has stopped at a station for inflating tires of the vehicle and switches to immobilization mode 53 so as to receive two signals, coming from a wheel unit 3a to 3d, which are frequency-shift modulated respectively between two first predetermined frequencies defining, between them, a first frequency band and a second frequency band. For the central unit 2, the immobilization mode 53 influences the filtering of these two signals, this being illustrated in step 54.

In immobilization mode with detection of a pressure variation, as soon as reception of the modulated signal from a wheel unit 3a to 3d takes effect at the central unit 2, this modulated signal may be the first frequency-shift keyed signal with the first frequency band or the second frequency-shift keyed signal with the second frequency band.

As shown in step 55, the central unit 2 is then reprogrammed so as to perform filtering of the received modulated signal using at least one of two different filter bandwidths that alternate periodically. Specifically, it is unknown whether the central unit 2 will receive a modulated signal of the first type with a first frequency band or a modulated signal of the second type with a second frequency band.

The first filter bandwidth is suitable for filtering modulated signals with a first frequency band and the second filter bandwidth is suitable for filtering modulated signals with a second frequency band.

The two filter widths are respectively a narrow width of around 50 kHz and a wide width of around 300 kHz. In immobilization mode, upon reception of the first modulated signal from a wheel unit 3a to 3d arriving at the central unit 2, the central unit 2, which is then in standby state, is reprogrammed so as to change to periodic awake mode.

There may be alternation between the two different bandwidths. The period of alternation between the two different bandwidths is adapted to a duration of the signal, such that the received modulated signal is able to be filtered with the two bandwidths if a first filtering operation with the first of the two bandwidths has not given a useful signal. In parallel with this, the central unit 2 may retain programming in driving mode for other applications.

When the measured duration exceeds the reference duration, for example 45 seconds, established in the duration countdown test 51, this corresponding to the output Yes Y of the duration countdown test, the central unit 2 concludes that inflation of the vehicle has stopped and switches to reception driving mode 59 in order to receive the signals and filter them with just one filtering band.

Step 54 illustrates the reception step after filtering of the signals in driving mode 59 and in immobilization mode 53, respectively after or before the reference duration of the time countdown test 51 has been exceeded.

In driving mode 57 or 59, the central unit 2 receives only modulated signals that always have one and the same frequency band. These modulated signals are filtered with one and the same filter bandwidth by the central unit 2.

In immobilization mode 53, optionally, if the wheel unit 3a to 3d transmits information other than that in relation to the pressure of its tire, the central unit 2 may also be configured in "driving" mode so as to receive the signals in relation to this information.

An aspect of the invention also relates to a system for assisting in the inflation of tires of a vehicle, the vehicle being stationary in an immobilization mode, the method consisting in continuously measuring at least the pressure of each tire 1a to 1d by way of a wheel unit 3a to 3d, and in transmitting signals on the state of the tires 1a to 1d via a wireless link 5a to 5d between each wheel unit 3a to 3d and a central unit 2. The central unit 2 has means for continuously analyzing these signals and then means for transmitting information in relation to the state of the tires 1a to 1d to an information module 9, which may be a mobile telephone.

A pressure variation above a predetermined threshold of a tire associated with each wheel unit 3a to 3d and detected by detection means of the wheel unit 3a to 3d gives rise to the transmission of a signal to the central unit 2 by transmission means of the wheel unit 3a to 3d, these signals being transmitted by each wheel unit 3a to 3d by frequency-shift keying between two first predetermined frequencies defining, between them, a first frequency band.

According to an aspect of the invention, when the vehicle is stationary in immobilization mode, the system implements a method such as described above and comprises means for reprogramming each wheel unit 3a to 3d such that each wheel unit 3a to 3d transmits, to the central unit 2, a first frequency-shift keyed signal with the first frequency band and a second frequency-shift keyed signal with a second frequency band wider than the first band.

These reprogramming means may be integrated into each wheel unit 3a to 3d or be present in the central unit 2, and reprogramming signals may be sent to each wheel unit 3a to 3d.

Aspects of the invention are not limited to the exemplary embodiments that are described and shown. Thus, various low bit rate values may be chosen for the various cases of "immobilization" mode that are found in this method: stationary situation with tire inflation or simple parking situation.

This method could be integrated into a more complete method incorporating all of the aspects of existing systems regarding technical tire management. By way of example, a method that adjusts the time at which the driver is informed depending on the importance, or lack thereof, of the loss of pressure of a tire. Moreover, the technique of repeatedly sending each information frame ("time diversity") may also be added to the method according to an aspect of the invention.

The invention claimed is:

1. A self-adaptive method for assisting in the inflation of tires of a vehicle, the vehicle being stationary in an immobilization mode, the method comprising:
    continuously measuring at least a pressure of each tire by way of a wheel unit associated with each tire,
    transmitting signals on a state of the tires via a wireless link between each wheel unit and a central unit, the central unit continuously analyzing these signals and then transmitting information in relation to the state of the tires to an information module, a pressure variation above a predetermined threshold of a tire associated with each wheel unit and detected by the wheel unit giving rise to transmission of a signal to the central unit, these signals being transmitted by each wheel unit through frequency-shift keying between two first predetermined frequencies defining, between them, a first frequency band, wherein, when the vehicle is stationary in an immobilization mode, each wheel unit is reprogrammed such that each wheel unit transmits, to the central unit, a first frequency-shift keyed signal with the first frequency band and a second frequency-shift keyed signal with a second frequency band wider than the first band.

2. The method as claimed in claim 1, wherein the first frequency band is around 30 kHz and the second frequency band is equal to or greater than 50 kHz.

3. The method as claimed in claim 1, wherein, as soon as reception of the modulated signal from a wheel unit takes effect at the central unit, this modulated signal being the first frequency-shift keyed signal with the first frequency band or the second frequency-shift keyed signal with the second frequency band, the central unit is reprogrammed so as to perform filtering of the received modulated signal using at least one of two different filter bandwidths that alternate periodically.

4. The method as claimed in claim 3, wherein a period of alternation between the two different bandwidths depends on a duration of the signal, such that the received modulated signal is able to be filtered with the two bandwidths if a first filtering operation with one of the two bandwidths has not given a useful signal.

5. The method as claimed in claim 3, wherein the two filter widths are respectively a narrow width of around 50 kHz and a wide width of around 300 kHz.

6. The method as claimed in claim 3, wherein, upon reception of the modulated signal from a wheel unit, the central unit, which is then in a standby state, is reprogrammed so as to change to periodic awake mode.

7. The method as claimed in claim 1, wherein a stoppage in the immobilization mode is defined by an immobilization of the vehicle for a duration greater than a predetermined threshold duration.

8. The method as claimed in claim 1, wherein each wheel unit and the central unit are set by default to a driving mode detected by a movement of the vehicle, for which driving mode each wheel unit is programmed so as to transmit, to the central unit, a frequency-shift keyed signal with the first frequency band and, when the central unit has been reprogrammed so as to perform filtering of the received modulated signal using at least one of two different filter bandwidths, the central unit is programmed so as to perform filtering of the modulated signal using the larger of the filter bandwidths, each wheel unit also being programmed, in this driving mode, so as to transmit the frequency-shift keyed signals with the first frequency band.

9. The method as claimed in claim 8, wherein the signals that are frequency-shift keyed by each wheel unit are transmitted, when the vehicle is stationary in the immobilization mode, at a second bit rate lower than a first bit rate which is that of the driving mode.

10. A system for assisting in the inflation of tires of a vehicle, the vehicle being stationary in an immobilization mode, the system comprising:
    a wheel unit continuously measuring at least the pressure of each tire,
    a central unit,
    a wireless link transmitting signals on the state of the tires between each wheel unit and the central unit, the central unit continuously analyzing these signals and transmitting information in relation to the state of the tires to an information module, a pressure variation above a predetermined threshold of a tire associated with each wheel unit and detected by a detector of the wheel unit giving rise to the transmission of a signal to the central unit by a transmitter of the wheel unit, these signals being transmitted by each wheel unit through frequency-shift keying between two first predetermined frequencies defining, between them, a first frequency band,
    wherein, when the vehicle is stationary in an immobilization mode, the system implements the method as claimed in claim 1 and comprises means for reprogramming each wheel unit such that each wheel unit transmits, to the central unit, a first frequency-shift keyed signal with the first frequency band and a second frequency-shift keyed signal with a second frequency band wider than the first band.

11. The method as claimed in claim 2, wherein, as soon as reception of the modulated signal from a wheel unit takes effect at the central unit, this modulated signal being the first frequency-shift keyed signal with the first frequency band or the second frequency-shift keyed signal with the second frequency band, the central unit is reprogrammed so as to perform filtering of the received modulated signal using at least one of two different filter bandwidths that alternate periodically.

12. The method as claimed in claim 4, wherein the two filter widths are respectively a narrow width of around 50 kHz and a wide width of around 300 kHz.

* * * * *